United States Patent [19]

Zielke et al.

[11] Patent Number: 4,565,678

[45] Date of Patent: Jan. 21, 1986

[54] METHOD OF REDUCING SULFUR OXIDE AND NITROGEN OXIDE CONTENT OF FLUE GAS

[75] Inventors: Clyde W. Zielke, McMurray; Muh-Cheng M. Wu, Bethel Park, both of Pa.

[73] Assignee: Conoco Inc., Wilmington, Del.

[21] Appl. No.: 680,037

[22] Filed: Dec. 10, 1984

[51] Int. Cl.⁴ .................. C01B 21/00; C01B 17/00
[52] U.S. Cl. .................... 423/235; 423/242; 423/574 R
[58] Field of Search ........... 423/235, 235 D, 242 A, 423/242 R, 239, 239 A, 574 G

[56] References Cited

U.S. PATENT DOCUMENTS 4,086,324  4/1978  Welty ................................ 423/235

FOREIGN PATENT DOCUMENTS 51-1359   1/1976  Japan .
51-54899  5/1976  Japan .
51-77575  7/1976  Japan ................................ 423/235
52-722    1/1977  Japan .
52-29470  3/1977  Japan .
52-52178  4/1977  Japan ................................ 423/235
53-14678  2/1978  Japan .
53-18476  2/1978  Japan .
53-31587  3/1978  Japan .
53-90167  8/1978  Japan ................................ 423/235
54-4879   1/1979  Japan .

Primary Examiner—Gregory A. Heller
Attorney, Agent, or Firm—William A. Mikesell, Jr.

[57] ABSTRACT

Flue gas is treated by a regenerable wet scrubbing process to reduce sulfur- and nitrogen oxides by reacting with a solution containing ammonium thiosulfate and hydroxide, and a ferrous chelating agent. A portion of the spent scrubber solution is regenerated by reaction with hydrogen sulfide, flashed to hydrolyze the polysulfide content, and then returned as regenerated solution to the principal scrubbing circuit.

4 Claims, 1 Drawing Figure

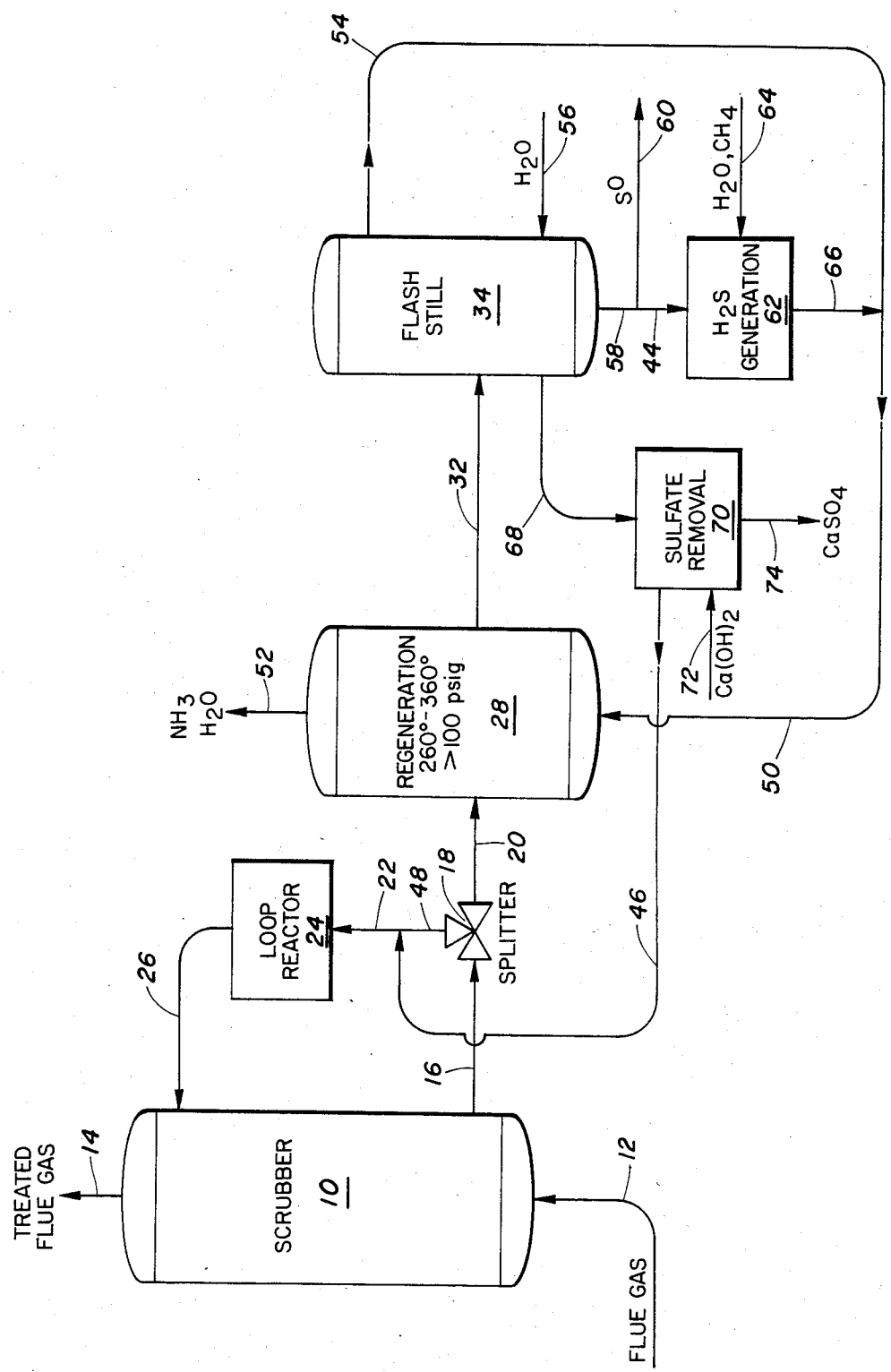

METHOD OF REDUCING SULFUR OXIDE AND NITROGEN OXIDE CONTENT OF FLUE GAS

FIELD OF THE INVENTION

This invention relates to a regenerable wet process for scrubbing flue gas to reduce its sulfur oxide and nitrogen oxide content. In one aspect, the invention relates to regeneration of an aqueous scrubbing solution in order to replenish its ammonium hydroxide, thiosulfate, and ferrous chelating agent contents.

DESCRIPTION OF THE PRIOR ART

It is known to treat flue gas, in order to reduce its noxious content, by contacting it with reagents in the dry state or in the wet state. Where wet or aqueous contacting is used, some processes are based on a 'once-through' procedure whereby the spent reagent containing the reacted noxious component is discarded, usually as a sludge. In order to decrease the problem of disposing of huge volumes of spent sludge, numerous processes have been proposed in which the reagents and reaction conditions are chosen so as to result in reaction products which are regenerable. Further, although the emphasis had earlier been on removal only of sulfur oxides from the flue gas, the more recent efforts are directed toward removal both of sulfur oxides, primarily $SO_2$, and of nitrogen oxides, i.e. $NO_x$.

Examples of wet regenerable processes adapted particularly to removal of sulfur oxides are U.S. Pat. No. 4,163,776 to Kulik et al and U.S. Pat. No. 4,231,996 to Kulik, which use an aqueous ammonia-containing scrubbing solution. Processes directed to removal both of sulfur oxides and nitrogen oxides include U.S. Pat. Nos. 4,013,430 to Adachi et al, 4,044,101 to Hisamatsu et al, 4,091,074 to Gorai et al, 4,186,176 to Kitamura et al, 4,222,991 to Hass, and 4,331,639 and 4,347,227, both to Hass et al. We are also aware of the following Japanese patent publications which, by their abstracts, relate to various versions of regenerable wet $SO_2/NO_x$ processes: Nos. 51-1359, 51-54899, 52-772, 52-29470, 53-14678, 53-18476, 53-31587, and 54-4879.

The task of removing both $SO_x$ and $NO_x$ by a regenerable process is quite difficult. One fundamental reason for this may be that sulfur and nitrogen both exist in several valence states. Another reason is that the flue gas, which comprises the feed to the process, is often highly variable both in composition and in quantity, even at a given installation. In any event, a few of the problems which are known to plague various of the prior-art processes include plugging of the scrubbing column and of other reagent conduits by unplanned precipitation of reagents, formation of an ammonia plume from the discharge stack, excessively complex process flow sheet with the attendant high capital costs and difficulty of control, excessive reagent costs occasioned by exotic reactants or high losses, and prohibitively high scrubber residence times or pressure drops.

SUMMARY OF THE INVENTION

According to the present invention, we have provided a regenerable wet scrubbing process wherein flue gas is contacted in a vapor-liquid contactor with an aqueous solution containing ammonium ion, thiosulfate and a ferrous chelating agent complex. After the contacting, one portion of the solution is recirculated through a loop reactor to the contactor, and another portion is passed to regeneration. Regeneration comprises two steps, viz. reduction of the reaction products by addition of hydrogen sulfide at relatively mild conditions, as will be explained, followed by a flashing of the regenerated liquid to produce elemental sulfur. In one preferred embodiment of this process, the flashed stream, after sulfur removal, can be subjected to a precipitation to remove minor amounts of sulfate prior to its return to the loop reactor. In another embodiment, a portion of the elemental sulfur by-product is reacted to produce the hydrogen sulfide required for the reduction step of the regeneration.

BRIEF DESCRIPTION OF THE DRAWING

The sole FIGURE of the drawing comprises a flow sheet of the process according to our invention.

DETAILED DESCRIPTION OF THE INVENTION

The invention will be described first, in terms of the process steps, by referring to the drawing, and second, in terms of the chemistry involved, by referring to tables and to examples.

In the drawing, scrubber 10 represents any suitable gas-liquid contactor as is known in the art, such as a tower containing packing or trays. The gas and liquid flows can be cocurrent or countercurrent, and are shown here as countercurrent. Thus, flue gas to be treated is passed by way of conduit 12 into a lower portion of contactor 10, and treated flue gas is recovered from an upper portion by way of conduit 14 for passage to a stack or other disposal. Scrubbing solution containing the removed flue gas contaminants is removed from scrubber 10 by conduit 16, and is passed to a splitter 18, which can comprise a proportioning valve, where it is divided into two portions in conduits 20 and 48. The portion in conduit 48 is admixed with freshly regenerated solution from conduit 46 and is passed by way of conduit 22 to loop reactor 24 and thence by way of conduit 26 into the top of scrubber 10. The circuit just described, comprising elements 10, 16, 18, 48, 22, 24 and 26, defines the primary scrubbing loop.

The portion of solution from splitter 18 which is directed to conduit 20 is regenerated for return to the primary loop by way of conduit 46 as follows. Fat scrubbing solution is passed from conduit 20 into regeneration reactor 28, where it is reduced by reaction with hydrogen sulfide introduced by way of conduit 50. This reaction evolves ammonia and steam, removed by way of conduit 52. The reduced solution is then passed by conduit 32 to a flash distillation zone 34. The flashing evolves gaseous hydrogen sulfide which is passed by way of conduit 54 to conduit 50. The liquid remaining in the flash zone is hydrolyzed by addition of steam from conduit 56, forming two mutually immiscible liquid phases. A molten elemental sulfur phase is withdrawn from still 34 by way of conduit 58, and can be removed by way of conduit 60 as a saleable product. A portion of the sulfur can be passed by conduit 44 to a hydrogen sulfide generation zone 62, where it can be reacted with steam and a hydrocarbon such as methane from conduit 64, for example in the manner shown in U.S. Pat. No. 4,332,774, to produce additional hydrogen sulfide added by way of conduit 66 to conduit 50.

The aqueous phase is removed from still 34 by way of conduit 68. Depending upon the flue gas composition and the operating conditions in elements 24 and 28, this solution may contain excessive sulfate ion. If not, its regeneration is complete at this point, and it can be returned via conduit 46 to the primary loop. Excessive sulfate can be removed for example by precipitation and filtration in a sulfate removal zone 70, wherein a reagent such as milk of lime, calcium hydroxide, is added by way of conduit 72, and the precipitated sulfate, e.g. calcium sulfate dihydrate, is removed by way of conduit 74.

Suitable exemplary reaction conditions in reaction zones 10, 24, 28 and 34 are as follows:

Scrubber 10: Gas residence time 1-6 seconds depending upon flue gas $NO_x$ concentration, liquid feed rate of 3 to 15 gal/min/ft$^2$, pH about 5.8 to 6.0, pressure ambient, and temperature about 110°-150° F. (43°-66° C.), preferably about 135° F. (57° C.).

Loop reactor 24: Temperature and pressure as in scrubber 10, residence time up to about 30 minutes (preferably about 10 minutes) depending on the degree of $NO_x$ removal desired.

Regenerator 28: Temperature about 275°-325° F. (135°-163° C.), pressure 150-250 psig.

Flash still 34: Flashed temperature about 110°-150° F. (43°-66° C.), flashed pressure ambient.

It can be seen from the preceding description of the flow diagram and its operating conditions that the operating conditions are mild, the items of equipment required are quite conventional, and the process is relatively simple.

The $NO_x$ content of a raw flue gas is primarily dependent on the amount of excess combustion air and on the combustion temperature, and the $SO_x$ content obviously depends on the sulfur content of the fuel being burned.

The underlying chemical principles of our process involve capture in the scrubber 10 of $SO_2$ and NO by hydroxyl ion and a ferrous salt of a chelating agent such as ethylene-diaminetetraacetic acid (EDTA) respectively:

  (1)

  (2)

We prefer concentrations in conduit 26 of about 0.01 to 0.25M Fe(II)EDTA$^=$, and about 2M (NH$_4$)$_2$S$_2$O$_3$, the function of which will become obvious. Other chelating agents can be used, for example as specified in the above-cited U.S. Pat. No. 4,130,430. The pH of this lean scrubber solution is maintained in the desired range by addition of ammonium ion in the form of sulfide or hydroxide, e.g. to loop reactor 24. Finally, the scrubber solution also contains a minor equilibrium amount of sulfate ion, i.e. (NH$_4$)$_2$SO$_4$, as a result of bisulfite oxidation in the scrubber:

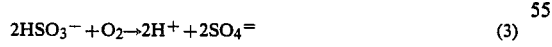  (3)

The high concentration of thiosulfate in the scrubber loop suppresses this undesirable oxidation of bisulfite, in addition to performing an extremely important feature of our invention of minimizing the undesirable oxidation of the ferrous EDTA to the ferric EDTA, Fe(III)EDTA$^-$, which form has virtually no capacity to absorb nitrogen oxides. It also decreases the water vapor pressure in the scrubber.

The function of the loop reactor 24 is to provide mixing of streams 46 and 48, surge capacity, and residence time. The prevailing reducing atmosphere therein derives from the added bisulfide content of stream 46, which serves to regenerate bisulfite:

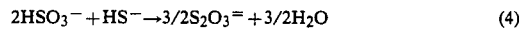  (4)

and also from the bisulfite and thiosulfate. These three reducing agents act on the complexed NO to form molecular nitrogen, vented in scrubber 10, according to equations (5)-(7), and to form ammonia derivatives as shown for example in equation (8):

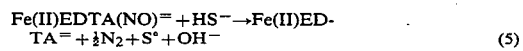  (5)

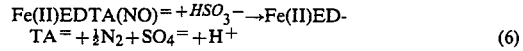  (6)

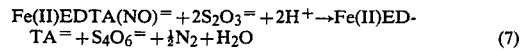  (7)

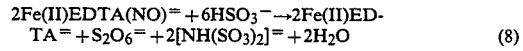  (8)

It is our observation that in our system, about 30% of the complexed NO is reduced to nitrogen, and about 70% to the ammonium or imido-type products. The reducing agents also serve to reduce any ferric EDTA to the useful ferrous form. The presence of elemental sulfur is undesirable in this loop, as formed for instance in equation (5), and it is scavenged by the bisulfite at about pH 6, as:

  (9)

The high availability of the ferrous EDTA in our reducing environment provides excellent absorption of NO in the scrubber. We have obtained 88 percent NO absorption in a saddle-packed tower using 6 seconds residence time with no measurable pressure drop, and 60 percent absorption with 2 seconds residence and a ΔP of only 2 inches of water. In both instances, 99.8+% of the SO$_2$ was removed.

In regenerator 28, a small slip stream of fat scrubbing solution is continually diverted for reduction with hydrogen sulfide. For example, the thiosulfate, dithionate, tetrathionate, and imido disulfate are variously reduced to ammonium polysulfides such as pentasulfide and ammonia, remaining complexed NO is reduced to molecular nitrogen and to ammonia, and ferric EDTA is reduced to the ferrous form. Principal reactions here are:

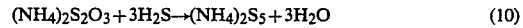  (10)

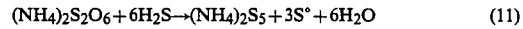  (11)

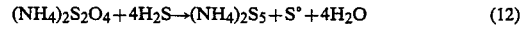  (12)

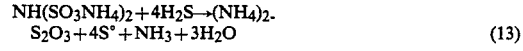  (13)

In flash still 34, the regenerated solution containing pentasulfide is hydrolyzed to form hydroxide, bisulfite, hydrogen sulfide, and elemental sulfur:

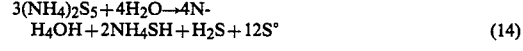  (14)

The pressure let-down in still 34 is controlled to provide the desired ratio of hydroxide to bisulfide in the scrubber through the reversible reaction:

$$NH_4OH + H_2S \rightarrow NH_4HS + H_2O \tag{15}$$

It can be seen that the regeneration operates at mild conditions, does not require a catalyst, and produces the useful elemental form of sulfur without the need of expensive Claus unit.

If the particular operating conditions selected for a given level of scrubbing result in excessive sulfate by equation (3), sulfate can be removed as stated earlier by precipitation with calcium ion at ambient pressure and slightly elevated temperature, e.g. 135° F. (57° C.), followed by separation of the precipitate as by filtration. As was also stated earlier, a portion of the elemental sulfur produced can be used to generate the required hydrogen sulfide reductant, as disclosed for example in U.S. Pat. No. 4,332,774; this patent teaches reaction conditions of about 1050° F. (565° C.) and 30 psig:

$$2S° + CH_4 + 2H_2O \rightarrow 4H_2S + CO_2 \tag{16}$$

which avoids the requirement of a primary reductant such as hydrogen.

The invention will now be illustrated further by the following three tabular material balances which show: in Example I, a relatively low ratio of $NO_x$ to $SO_x$, in Example II a relatively higher ratio of $NO_x$ to $SO_x$ with 70% of the scrubbed NO being reduced to $NH_3$, and in Example III the same higher ratio of $NO_x$ to $SO_x$ but with all scrubbed NO being reduced only to molecular nitrogen. In all examples, the feed bituminous coal contains 13,370 Btu/lb. with 4.55 weight percent sulfur and 1.50 weight percent nitrogen. Combustion is in a PC (pulverized coal) burner with 25% excess air, to produce 330,000 SCF flue gas/T coal. The flue gas contains 3111 ppm $SO_2$, with 90% or 2800 ppm being removed by scrubbing, and 780 ppm $NO_x$.

EXAMPLE I

| Flow rate, | Removal of 2800 ppm $SO_2$ and 500 ppm $NO_x$ with 30% to $N_2$ and 70% to $NH_3$ | | | | | |
|---|---|---|---|---|---|---|
| | Stream No. | | | | | |
| # mol/hr | 12 | 14 | 52 | 56 | 60 | 64 |
| $SO_2$ | 3111 | 311 | | | | |
| NO | 777 | 277 | | | | |
| $N_2$ make | | 75 | | | | |
| $NH_3$ | | | 350 | | | |
| $H_2O$ | | | 7200 | 2800 | | 3312.5 |
| $CH_4$ | | | | | | 1656.25 |
| S° | | | | | 2800 | |

EXAMPLE II

| Flow rate, | Removal of 2800 ppm $SO_2$ and 700 ppm $NO_x$, with 30% to $N_2$ and 70% to $NH_3$ | | | | | |
|---|---|---|---|---|---|---|
| | Stream No. | | | | | |
| # mol/hr | 12 | 14 | 52 | 56 | 60 | 64 |
| $SO_2$ | 3111 | 311 | | | | |
| NO | 777 | 77 | | | | |
| $N_2$ make | | 105 | | | | |
| $NH_3$ | | | 490 | | | |
| $H_2O$ | | | 7560 | 2800 | | 3517.5 |
| $CH_4$ | | | | | | 1758.75 |
| S° | | | | | 2800 | |

EXAMPLE III

| Flow rate, | Removal of 2800 ppm $SO_2$ and 700 ppm $NO_x$, 100% converted to $N_2$ | | | | | |
|---|---|---|---|---|---|---|
| | Stream No. | | | | | |
| # mol/hr | 12 | 14 | 52 | 56 | 60 | 64 |
| $SO_2$ | 3111 | 311 | | | | |
| NO | 777 | 77 | | | | |
| $N_2$ make | | 350 | | | | |
| $H_2O$ | | | 6825 | 2800 | | 3150 |
| $CH_4$ | | | | | | 1575 |
| S° | | | | | 2800 | |

The present specification and claims comprise an explanation of the principles and of the presently preferred mode of construction and operation of this invention. It should be understood that reasonable variation and modification are within the scope of this specification and the appended claims.

We claim:

1. The method for simultaneously removing both sulfur oxides and nitrogen oxides from a mixture of gases containing such oxides in a regenerable wet-scrubbing process, which method comprises:
   (a) contacting said mixture of gases in a gas-liquid contacting zone with fresh aqueous scrubbing solution comprising ammonium hydroxide, ammonium thiosulfate, and a ferrous chelating agent salt, said solution being at a pH between about 5.8 and 6.0;
   (b) removing from said contacting zone as a product of the process a gaseous stream containing a significantly reduced proportion of sulfur oxides and nitrogen oxides, and an increased proportion of molecular nitrogen;
   (c) also removing from said contacting zone spent aqueous scrubbing solution containing an increased concentration of bisulfite and nitric oxide chelate complex;
   (d) passing a first portion of said spent solution to regeneration described further hereinafter;
   (e) admixing a second portion of said spent solution with regenerated solution from said regeneration;
   (f) passing the admixed solution from step (e) to a residence-time reaction zone to produce fresh aqueous scrubbing solution;
   (g) returning the fresh aqueous scrubbing solution from step (f) to said contacting zone of step (a);
   (h) adding hydrogen sulfide to said first portion of spent solution at elevated temperature and pressure as an initial step of said regeneration to reduce sulfur-containing compounds therein to polysulfides and to produce water vapor and elemental sulfur;
   (i) flashing the reduced spent solution from step (h) to a zone of lower pressure to produce an aqueous liquid phase containing increased concentrations of ammonium hydroxide and bisulfide, minor amounts of sulfate, and liquid elemental sulfur;
   (j) removing elemental sulfur from said zone of lower pressure as a product of the process; and
   (k) returning said aqueous liquid phase of step (i), as comprising said regenerated solution, to said admixing of step (e).

2. The method of claim 1 wherein the pH of said fresh aqueous scrubbing solution is maintained in the range of about 5.8 to 6.0 by addition of ammonia.

3. The method of claim 1 wherein a portion of the elemental sulfur product from step (j) is reacted with steam and a hydrocarbon at elevated temperature and pressure to produce a portion of the hydrogen sulfide added in step (h).

4. The method of claim 1 wherein the aqueous liquid phase of step (i) is reacted with a solution of calcium ion, and the resulting calcium sulfate solids are removed from said aqueous liquid phase prior to the returning of step (k).

* * * * *

UNITED STATES PATENT OFFICE
CERTIFICATE OF CORRECTION

PATENT NO. : 4,565,678
DATED : January 21, 1986
INVENTOR(S) : Zielke et al

It is certified that error appears in the above-identified patent and that said Letters Patent are hereby corrected as shown below:

Column 5, line 32, "13,370" should read --12,370--

Signed and Sealed this

Fifth Day of August 1986

[SEAL]

Attest:

DONALD J. QUIGG

Attesting Officer    Commissioner of Patents and Trademarks